Patented Aug. 9, 1932

1,870,842

UNITED STATES PATENT OFFICE

LAWRENCE H. FLETT, OF HAMBURG, NEW YORK, ASSIGNOR TO NATIONAL ANILINE & CHEMICAL COMPANY, INC., OF NEW YORK, N. Y., A CORPORATION OF NEW YORK

PRODUCTION OF DIAZO-NITROARYL COMPOUNDS

No Drawing.   Application filed August 24, 1929.   Serial No. 388,268.

This invention relates to a process for the production of diazo-nitroaryl compounds and more particularly to the production of para-diazo-nitrobenzene.

It is an object of the invention to provide a process in accordance with which the production of diazo-nitroaryl compounds from acylated nitroarylamines, or from acylated arylamines, is simplified and made more efficient, and in accordance with which the expense of production of diazo-nitroaryl compounds is reduced.

Another object of the invention is to provide a process in accordance with the operations of which there is effected a saving in materials and in which various steps heretofore considered as necessary have been eliminated. Further, there is provided a process capable of satisfactory commercial operation.

Other objects of the invention will in part be obvious and will in part appear hereinafter.

The invention accordingly comprises the several steps of the process and the relation of one or more of such steps with respect to each of the others thereof, and will be exemplified in the process hereinafter disclosed, and the scope of the invention will be indicated in the claims.

In the production of diazo-nitroaryl compounds it has previously been the procedure to first nitrate a corresponding acylarylamine, then to isolate the acylated nitroarylamine thus produced as the main product of the reaction and then to split off the acyl group and isolate from the reaction mixture the nitroarylamine so produced and finally to redissolve and diazotize the nitroarylamine.

In the practice of the present invention, an N-acylated nitroarylamine is saponified in the presence of a mineral acid, and the nitroarylamine thus produced, without isolation from the saponification mass, is diazotized to form a diazo-nitroaryl compound by subjecting the reaction mass to the action of a nitrate, the diazotization being carried out preferably during or after the dilution of the reaction mass or the nitrite, or both, with water. The invention also includes the production of a diazo-nitroaryl compound from an N-acylated arylamine without isolation or purification of the intermediate compounds produced, by a process which involves nitrating an N-acylated arylamine to produce N-acylated nitroarylamine, saponifying off the acyl group to produce the nitroarylamine, and diazotizing the resulting nitroarylamine.

More particularly, an acyl-arylamine is nitrated preferably with a mixed nitrating acid containing nitric and sulfuric acids, the sulfuric acid being present in an amount preferably greater than that which is required for nitration. After the nitration is completed, the resulting reaction mass is heated in the presence of sulfuric acid, which may be that employed in the nitration or which may be sulfuric acid introduced afterwards, or both, or other suitable mineral acid, in order to split off or saponify the acyl group. The primary nitroamino compound resulting from the saponification is diazotized without isolation from the reaction mass by treating the resulting reaction mass with sodium nitrite to produce the diazo-nitroaryl compound. The diazo-nitroaryl compound thus obtained is suitable and well adapted for use in the preparation of azo dyestuffs and for other procedures in which its use as an intermediate may be desirable.

As an illustrative embodiment of a manner in which the process of the invention may be practiced, the following examples are given. The parts are by weight.

*Example 1.*—110 parts of acetanilide are charged slowly into 425 parts of 66°Bé. sulfuric acid with constant stirring, and 118 parts of mixed nitrating acid containing 29% nitric acid and 57% sulfuric acid are introduced. 110 parts more of acetanilide are then added, and followed by the addition of 236 parts of mixed nitrating acid of the same composition as that previously used. During the addition of the charge and during the nitration, the temperature is maintained between 25°–30° C. When the additions are complete the acetanilide should be in solution. Following nitration, the mass, in order to remove the acetyl group, is heated to 90°–115°

C. for a period of several hours, or until a test portion of 15 drops in 5 cc. of water gives a clear diazo solution when sodium nitrite is added. If a curdy precipitate appears in this test, it indicates that saponification of the acetyl group and its replacement by hydrogen is not completed, in which case heating is continued a while longer. When the saponification is complete, the solution is cooled and then is ready for diazotization. This solution is added, and also 110 parts sodium nitrite are added, each separately and by stages to a mixture of 2800 parts ice and 110.5 parts of surfuric acid, 50° Bé. A vigorous agitation and an excess of nitrous acid are maintained throughout the period of addition. When the additions are complete, the diazo solution is stirred for a while longer, e. g., about one hour. It should give a faint test for nitrous acid. During diazotization, the temperature is kept low, e. g., 0°–5° C. The resulting solution of p-diazo-nitrobenzene may be coupled with suitable intermediates for the production of dyestuffs, or it may be preserved in ways known to the art.

*Example 2.*—540 parts nitroacetanilide are charged into a mixture of 1500 parts muriatic acid of a strength of about 20° Bé. and 2000 parts water. The mixture is heated at boiling until it becomes clear or until saponification is complete. When the saponification is complete the solution is cooled and is then diazotized as described in Example 1, using a corresponding proportion of sodium nitrite and other reagents and ingredients.

It will be understood that the invention in its broad aspect is not limited to the compounds and specific conditions as set forth in the examples hereinbefore given but that it may be utilized for the production of diazo-nitroaryl compounds other than diazo-nitro-benzene and that the amino group, during the nitrating period, may be protected by other acyl groups than the acetyl group. Accordingly, in place of acetanilide there may be used the acyl derivatives of its homologues and, further, the alkyl ethers of acetanilide and of its homologues may be used. It is desired further to indicate that the invention is not limited to the particular method of nitration above described for the reason that other methods of nitration may be employed to introduce the nitro group and when such other method of nitration is employed then the acyl group may be split off by heating the resulting nitration reaction mass with the addition of a mineral acid, as sulfuric acid, and hydrochloric acid in the event that an acid such as sulfuric acid has not been used in sufficient quantity during the nitration period.

By proceeding in accordance with the foregoing method a marked saving in materials may be effected, as well as a marked saving in the time reqired to complete the production of the diazo-nitroaryl compounds because of the elimination of various steps heretofore practiced, such as precipitating the acylated nitro-arylamine, filtering and redissolving it, precipitating the nitro-arylamine and filtering it, and finally dissolving it in acid for diazotization when it was desired to proceed with the acylated nitro-arylamine as the starting material for effecting the production of the diazo compound.

Since certain changes may be made in carrying out the above process without departing from the scope of the invention, it is intended that all matter contained in the above description shall be interpreted as illustrative and not in a limiting sense.

Having described my invention, what I claim as new and desire to secure by Letters Patent is:

1. A process for the production of diazo-nitroaryl compounds which comprises nitrating an acylated arylamine to form a nitro-acylarylamine, heating the resulting nitro-acylarylamine, without isolation from the reaction mass, in the presence of a mineral acid to split off the acyl group, and then diazotizing the resulting nitro-arylamine without isolation from the resulting mixture.

2. A process for the production of diazo-nitroaryl compounds which comprises nitrating an acylated arylamine in the presence of sulfuric acid, heating the resulting reaction mass with the production of a nitro-arylamine, and then causing that resulting reaction mass to react with a nitrate to produce a diazo-nitroaryl compound.

3. A process for the production of a diazo-nitroaryl compounds which comprises nitrating an acylated arylamine in the presence of sulfuric acid in an amount greater than that required for nitration, heating the resulting reaction mass with the production of a nitro-arylamine, and then causing that resulting reaction mass to react with a nitrite to produce a diazo-nitroaryl compound.

4. A process for the production of diazo-nitrobenzene which comprises nitrating an acylaniline with a mixture of nitric and sulfuric acids to form the acyl-nitroaniline, then heating the acyl-nitroaniline, without isolation thereof from the reaction mass, to form nitroaniline, and then admixing the resulting reaction mass with sodium nitrite with the production of diazo-nitrobenzene.

5. A process for the production of diazo-nitrobenzene which comprises nitrating acetanilide with a mixture of nitric and sulfuric acids at a temperature of 25° to 30° C. to form nitro-acetanilide, then heating the nitro-acetanilide, without isolation from the resulting reaction mass, with the formation of p-nitraniline, and then diazotizing the p-nitraniline without isolation from the reaction mass thus obtained.

6. A process for the production of diazo-nitrobenzene which comprises nitrating acetanilide at a temperature of 25° to 30° C. with a mixture of nitric and sulfuric acids to form nitro-acetanilide, the sulfuric acid being in an amount greater than that required for nitration, then heating the nitro-acetanilide without isolation from the resulting reaction mass, with the formation of p-nitraniline, and then diazotizing the p-nitraniline without isolation from the reaction mass thus obtained.

7. A process for the production of diazo-nitrobenzene which comprises nitrating acetanilide at a temperature of 25° to 30° C. with a mixture of nitric and sulfuric acids to form nitro-acetanilide, the surfuric acid being in an amount greater than that required for nitration, then heating the nitro-acetanilide, without isolation from the resulting reaction mass, with the formation of p-nitraniline, and then diazotizing the p-nitraniline without isolation from the reaction mass thus obtained, by adding the cooled reaction mass and sodium nitrite separately and by stages to a mixture of ice and sulfuric acid.

8. A process for the production of a diazo-nitroaryl compound which comprises treating a nitro acylarylamine with a mineral acid to saponify off the acyl group, and without isolation from the resulting solution, diazotizing the nitro-arylamine thus produced.

9. A process for the production of a diazo-nitroaryl compound which comprises treating a nitro-acetylarylamine with a mineral acid to saponify off the acetyl group, and without isolation from the resulting solution, diazotizing the nitroarylamine thus produced.

10. A process for the production of a diazo-nitrophenyl compound which comprises treating a nitro-acylphenylamine with a mineral acid to saponify off the acyl group, and without isolation from the resulting reaction liquor, diazotizing the nitro-phenylamine thus produced.

11. A process for the production of a diazo-nitro-phenyl compound which comprises treating a nitro-acetylphenylamine with a mineral acid to saponify off the acetyl group, and without isolation from the resulting reaction liquor, diazotizing the nitrophenylamine thus produced.

12. A process for the production of diazo-nitrobenzene which comprises treating nitro-acylanilide with a mineral acid to saponify off the acyl group, and without isolation from the resulting reaction liquor, diazotizing the nitroaniline thus produced.

13. A process for the production of diazo-nitrobenzene which comprises heating nitro-acetanilide with a mineral acid to saponify off the acetyl group, and without isolation from the resulting solution, diazotizing the nitraniline thus produced.

14. A process for the production of diazo-nitrobenzene which comprises heating nitro-acetanilide with sulfuric acid to saponify off the acetyl group, and without isolation from the resulting solution, diazotizing the nitraniline thus produced.

15. A process for the production of a diazonitroaryl compound which comprises treating an acylated nitroarylamine with a mineral acid to saponify off the acyl group and then adding sodium nitrite and the reaction mass separately to a mixture of ice and a mineral acid.

16. A process for the production of a diazo-nitrophenyl compound which comprises treating an acylated nitrophenylamine with a mineral acid to saponify off the acyl group and then adding sodium nitrite and the reaction mass separately and by stages to a mixture of ice and a mineral acid.

17. A process for the production of a diazo-nitrobenzene which comprises treating nitro acetanilide with a mineral acid to saponify off the acetyl group, and then adding sodium nitrite and the reaction mass separately and by stages to a mixture of ice and mineral acid.

18. A process for the production of diazo-nitrobenzene which comprises treating nitro acetanilide with sulfuric acid to saponify off the acetyl group, and then adding sodium nitrite and the reaction mass separately and by stages to a mixture of ice and sulfuric acid, while maintaining an excess of nitrous acid.

19. A process for the production of diazo-nitrobenzene which comprises nitrating acetanilide at a temperature of 25° to 30° C. with a mixture of nitric and sulfuric acids to form nitro-acetanilide, the sulfuric acid being in an amount greater than that required for nitration, then heating the nitro-acetanilide, without isolation from the resulting reaction mass, with the formation of p-nitraniline, and then diazotizing the p-nitraniline, without separation from the mass thus obtained, by adding the cooled reaction mass and sodium nitrite separately and by stages to a mixture of ice and sulfuric acid while maintaining agitation and an excess of nitrous acid throughout the period of addition.

In witness whereof, I have hereunto set my hand.

LAWRENCE H. FLETT.

CERTIFICATE OF CORRECTION.

Patent No. 1,870,842.  August 9, 1932.

LAWRENCE H. FLETT.

It is hereby certified that error appears in the printed specification of the above numbered patent requiring correction as follows: Page 1, line 48, for the syllable "trate" read trite; page 2, line 101, claim 2, for "nitrate" read nitrite; and that the said Letters Patent should be read with these corrections therein that the same may conform to the record of the case in the Patent Office.

Signed and sealed this 22nd day of November, A. D. 1932.

(Seal)

M. J. Moore,
Acting Commissioner of Patents.